United States Patent
Duan et al.

(10) Patent No.: US 12,374,748 B2
(45) Date of Patent: Jul. 29, 2025

(54) BATTERY DEVICE AND ASSEMBLING METHOD THEREOF

(71) Applicant: CALB Co., Ltd., Jiangsu (CN)

(72) Inventors: Suqin Duan, Changzhou (CN); Xucheng Yin, Changzhou (CN); Junhui Liu, Changzhou (CN); Zunying Liu, Changzhou (CN); Hongtai Li, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 638 days.

(21) Appl. No.: 17/830,312

(22) Filed: Jun. 1, 2022

(65) Prior Publication Data
US 2023/0299409 A1   Sep. 21, 2023

(30) Foreign Application Priority Data
Mar. 15, 2022   (CN) .......................... 202210254206.1

(51) Int. Cl.
*H01M 50/256* (2021.01)
*H01M 50/204* (2021.01)
(Continued)

(52) U.S. Cl.
CPC ....... *H01M 50/256* (2021.01); *H01M 50/204* (2021.01); *H01M 50/244* (2021.01);
(Continued)

(58) Field of Classification Search
CPC ............. H01M 50/204; H01M 50/244; H01M 50/256; H01M 50/258; H01M 50/262;
(Continued)

(56) References Cited

U.S. PATENT DOCUMENTS

2021/0175572 A1*   6/2021   He ...................... H01M 10/613

FOREIGN PATENT DOCUMENTS

| CN | 112060897 A | * 12/2020 | ............... B60K 1/04 |
| CN | 212303800 | 1/2021 | |

(Continued)

OTHER PUBLICATIONS

Machine translation of CN-215680834-U, retrieved Feb. 2025 (Year: 2025).*

(Continued)

*Primary Examiner* — Nicole M. Buie-Hatcher
*Assistant Examiner* — Gilberto Ramos Rivera
(74) *Attorney, Agent, or Firm* — JCIP GLOBAL INC.

(57) ABSTRACT

A battery device includes a box body, a protective cover, at least one reinforcing beam, a plurality of lifting lug assemblies and at least one battery group. The box body has an insertion port. The reinforcing beam is arranged in the box body. Each lifting lug assembly includes a first part and a second part, and the second part and the first part are detachably connected. The first part is fixedly connected to the box body and the reinforcing beam, and a part of the first part adjacent to the protective cover and the battery group are provided with a gap therebetween or abut against each other in a first direction. The first direction is perpendicular to a direction in which the battery group is inserted into the box body, such that the battery group is inserted into the box body through the insertion port.

15 Claims, 7 Drawing Sheets

(51) Int. Cl.
*H01M 50/244* (2021.01)
*H01M 50/271* (2021.01)
*H01M 50/291* (2021.01)

(52) U.S. Cl.
CPC ....... *H01M 50/271* (2021.01); *H01M 50/291* (2021.01); *H01M 2220/20* (2013.01)

(58) Field of Classification Search
CPC ............. H01M 50/269; H01M 50/271; H01M 50/291; H01M 2220/20
USPC ........................................................ 429/121
See application file for complete search history.

(56) References Cited

FOREIGN PATENT DOCUMENTS

| CN | 212303800 | U | * | 1/2021 | |
|----|-----------|---|---|--------|---|
| CN | 112310541 | | | 2/2021 | |
| CN | 215527858 | | | 1/2022 | |
| CN | 215527858 | U | * | 1/2022 | |
| CN | 215680834 | | | 1/2022 | |
| CN | 215680834 | U | * | 1/2022 | |
| CN | 217239641 | | | 8/2022 | |
| WO | WO-2020133807 | A1 | * | 7/2020 | .......... H01M 50/103 |

OTHER PUBLICATIONS

Machine translation of WO-2020133807-A1, retrieved Feb. 2025 (Year: 2025).*
Machine translation of CN-215527858-U, retrieved Feb. 2025 (Year: 2025).*
Machine translation of CN-112060897-A, retrieved Feb. 2025 (Year: 2025).*
Machine translation of CN-212303800-U, retrieved Feb. 2025 (Year: 2025).*
"Rejection Decision of China Counterpart Application", issued on Jun. 27, 2024, with English translation thereof, p. 1-p. 7.
"Search Report of Europe Counterpart Application", issued on Nov. 29, 2022, p. 1-p. 8.
"Office Action of China Counterpart Application", issued on Dec. 6, 2023, with English translation thereof, p. 1-p.17.
"Office Action of China Counterpart Application", issued on Mar. 29, 2024, with English translation thereof, p. 1-p. 14.

* cited by examiner

BATTERY DEVICE AND ASSEMBLING METHOD THEREOF

CROSS-REFERENCE TO RELATED APPLICATION

This application claims the priority benefit of China application serial no. 202210254206.1, filed on Mar. 15, 2022. The entirety of the above-mentioned patent application is hereby incorporated by reference herein and made a part of this specification.

BACKGROUND

Technical Field

The present disclosure relates to the field of battery technology, and in particular, to a battery device and an assembling method for the battery device.

Description of Related Art

With the rapid development of modern industry, environmental pollution, energy shortage, resource depletion and other problems have become more prominent than before. In order to maintain the sustainable development of economy and protect the environment and energy supply for human living, zero-emission battery is the first choice as a new energy source.

However, in the current assembly process of a battery device, the middle lifting lug assembly interferes with the assembly of the battery into the box body.

It should be noted that the information disclosed in the above background section is only for enhancement of understanding of the background of the present disclosure, and therefore may contain information that does not form the related art that is already known to a person of ordinary skill in the art.

SUMMARY

The present disclosure provides a battery device and an assembling method of the battery device.

In an aspect of the present disclosure, a battery device is provided. The battery device includes a box body, a protective cover, at least one reinforcing beam, at least one battery group, and a plurality of lifting lug assemblies. The box body has an insertion port. The protective cover is disposed on the insertion port. The reinforcing beam is disposed in the box body. The battery group includes at least two batteries, and the battery group is arranged in the box body. Each of the lifting lug assemblies includes a first part and a second part. The second part is detachably connected to the first part, and the first part is fixedly connected to the box body and the reinforcing beam. A part of the first part adjacent to the protective cover and the battery group are provided with a gap therebetween or abut against each other in a first direction. The first direction is perpendicular to the direction in which the battery group is inserted into the box body, such that the battery group may be inserted into the box body from the insertion port, and the second part is fixedly connected to the protective cover.

In another aspect of the present disclosure, an assembling method for a battery device is provided. The assembling method is adopted for assembling the abovementioned above-mentioned battery device. The assembling method includes the following steps. Assembling the first part on the box body and the reinforcing beam, assembling the battery group into an accommodating cavity, assembling the second part on the first part, and assembling the protective cover on the box body and the second part.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

In the battery device in the related art, considering the overall energy density, the reinforcing beam is generally not made very wide (to avoid increasing the weight due to the wide reinforcing beam), and therefore the distance between adjacent accommodating cavities is smaller, or the width of outer edge of the accommodating cavity is narrower. The lifting lug assembly needs to be connected to the protective cover of the battery device, and the part where the lifting lug assembly and the protective cover are connected is generally provided with a protrusion. Moreover, in order to ensure the connection strength of the lifting lug assembly and the protective cover, the width of the protrusion needs to meet the requirements, and therefore the width of the protrusion is designed to be wider. Normally, the lifting lug assembly as a whole is assembled on the box body first, the lifting lug assembly includes the protrusion arranged at the part where the lifting lug assembly is connected to the protective cover, and the protrusion occupies part of the space of the accommodating cavity. As a result, the lifting lug assembly will interfere with the entry of the battery group into the box.

An exemplary embodiment of the present disclosure provides a battery device, as shown in FIG. 1 to FIG. 6, the battery device includes a box body 2, a protective cover 3, at least one reinforcing beam 4, a plurality of lifting lug assemblies 1, and at least one battery group 5. The box body 2 has an insertion port 23, the protective cover 3 is arranged on the insertion port 23, the reinforcing beam 4 is arranged in the box body 2, the battery group 5 includes at least two batteries 51, and the battery group 5 is arranged in the box body 2. Each of the lifting lug assemblies 1 includes a first part 1a and a second part 1b. The second part 1b is detachably connected to the first part 1a, the first part 1a is fixedly connected to the box body 2 and the reinforcing beam 4, and a part of the first part 1a adjacent to the protective cover 3 and the battery group 5 are provided with a gap 8 therebetween or abut against each other in a first direction X. The first direction X is perpendicular to a direction in which the battery group 5 is inserted into the box body 2, such that the battery group 5 may be inserted into the box body 2 from the insertion port 23, and that the second part 1b is fixedly connected to the protective cover 3.

In the battery device of the present disclosure, the first part 1a may be fixedly connected to the box body 2 and the reinforcing beam 4 first. When the battery group 5 is assembled into the box body 2, since a part of the first part 1a adjacent to the protective cover 3 and the battery group 5 are provided with the gap 8 therebetween or abut against each other in the first direction X, the first part 1a does not interfere with the battery group 5 being assembled into the box. The second part 1b has not been assembled yet, and therefore, the second part 1b will not interfere with the battery group 5 being assembled into the box, such that the battery group 5 may be inserted into the box body 2 from the insertion port 23.

It should be noted that, the detachable connection between the second part 1b and the first part 1a means that the first part 1a and the box body 2 may be connected together first, and then the battery group 5 is assembled into the box body 2, and the second part 1b is assembled afterwards, not just the conventional detachable connection between the first part 1a and second part 1b.

The battery device may be a battery device with a CIR (Cell In Room, battery directly assembled into the box) structure. In the battery device, the metal end plates and side plates at both ends of the battery group 5 are cancelled, and the box body is divided into a plurality of accommodating cavities mainly by using reinforcing beams, and the accommodating cavities are configured for accommodating a plurality of battery groups 5. Certainly, the battery device may also be a battery pack, and the battery group may be a battery module.

In the present exemplary embodiment, the box body 2 may include a bottom shield 21 and four side plates 22. The bottom shield 21 and the protective cover 3 may be arranged in a rectangular shape, and four side plates 22 are arranged around the bottom shield 21. The four side plates 22 are connected end to end to form a rectangular circle. The protective cover 3 is provided on the other side of the four side plates 22, and the protective cover 3 is arranged opposite to the bottom shield 21. The bottom shield 21, the protective cover 3 and the four side plates 22 are enclosed to form an accommodating space. The insertion port 23 is formed on one side surrounded by the four side plates 22 where the protective cover 3 is arranged, that is, the insertion port 23 is formed when the protective cover 3 is removed. When assembling the battery device, the bottom shield 21 and the four side plates 22 are assembled first to form the insertion port 23. After the insertion end of the battery group 5 is inserted through the insertion port 23, the protective cover 3 is assembled afterwards. The box body 2 may further include a heat exchange plate, and the heat exchange plate may be integrated with the bottom shield 21.

Certainly, in other exemplary embodiments of the present disclosure, the bottom shield 21 and the protective cover 3 may be arranged into a circle, an ellipse, a trapezoid, etc., and the number of side plate 22 may be one or multiple, and the side plates 22 may surround into a circle, an ellipse, a trapezoidal, etc., such that the battery box is formed into a cylindrical shape, an elliptical cylindrical shape, a prismatic shape, or the like. The battery box may further have other shapes, which will not be repeated here.

The box body 2 may further include a plurality of reinforcing beams 4, and the plurality of reinforcing beams 4 may all be transverse beams, and the plurality of reinforcing beams 4 may all be longitudinal beams, and the plurality of reinforcing beams 4 may further include some transverse beams and some longitudinal beams. The extending direction of the transverse beam and the extending direction of the longitudinal beam may intersect each other, for example, may be perpendicular to each other. The reinforcing beam 4 may be arranged on the inner side wall of the side plate 22, and the plurality of reinforcing beams 4 divide the accommodating space into a plurality of accommodating cavities, and the battery group 5 is arranged in each of the accommodating cavities.

In the present exemplary embodiment, the battery group 5 may include at least two batteries 51, and the batteries 51 may be provided as cuboids. The at least two batteries 51 are arranged in sequence along the first direction X to form a cuboid structure, and the first direction X is consistent with the width direction of the batteries 51, that is, the at least two batteries 51 are sequentially arranged along the width direction to form a cuboid structure. The plurality of battery groups 5 are arranged in an array in the box body 2.

Certainly, in other exemplary embodiments of the present disclosure, the battery group may include more batteries 51, the above number of the batteries 51 is provided only as examples. Furthermore, the structure of the battery group 5 may vary when the structure of the batteries 51 is different. For example, when the batteries 51 are disc-shaped, the battery group may be provided in a cylindrical shape.

In the present exemplary embodiment, the battery group 5 may further include two end insulating plates 52, and the two end insulating plates 52 are correspondingly arranged at both ends of the stacking direction of the battery 51, that is, the two end insulating plates 52 are correspondingly arranged at both ends of the first direction X of the plurality of batteries 51, in other words, the two end insulating plates 52 are disposed on the outermost side of the plurality of batteries 51, and the two end insulating plates 52 sandwich the plurality of batteries 51 therebetween. The end insulating plates 52 may provide protection to the plurality of batteries 51. A part of the first part 1a adjacent to the protective cover 3 and the end insulating plate 52 are provided with a gap therebetween or abut against each other in the first direction X, by this arrangement, the battery group including the end insulating plate 52 may also be inserted into the box body 2 through the insertion port 23.

A buffer pad may be arranged between two adjacent batteries 51. After one battery 51 is collided, the buffer pad may absorb the impact force and prevent the impact force from being transmitted to the adjacent batteries 51, thereby avoiding a chain reaction caused by the collision. The buffer pad may also be arranged between the battery 51 and the end plate body. After the end plate body is collided, the buffer pad may absorb the impact force and prevent the impact force from being transmitted to the adjacent batteries 51, thereby avoiding the chain reaction caused by the collision.

The buffer pad has certain elasticity, and the material of the buffer pad may be foam, silica gel and so on. In the case where the buffer pad is foam, the buffer pad may be adhered to the two batteries 51 on both sides through an adhesive, and the buffer pad may be adhered to the batteries 51 on both sides and the end plate body through the adhesive. When the buffer pad is made of silica gel, the two batteries 51 on both sides may be adhered together through silica gel, and the battery 51 and the end plate body may be adhered together through silica gel, such that the silica gel may further be used as a buffer pad. As such, silica gel not only plays a role in adhesion, but also provides buffering function.

The battery groups 5 abut against the reinforcing beams 4, and the reinforcing beams 4 may provide a pre-tightening force for the battery groups 5, such that the battery groups 5 are fixed in the box body 2 in the first direction. When assembling the battery group 5, a clamp may be used to clamp the outer sides of the two end insulating plates 52. Due to the elastic effect of the buffer pad, the length of the battery group 5 in the first direction X is shortened, such that one end of the battery group 5 may be smoothly inserted into the box body 2. However, if the lifting lug assembly 1 protrudes from the reinforcing beam 4, the lifting lug assembly 1 will interfere with the configuration of the battery group 5.

The first part 1a of each lifting lug assembly 1 may include a first sleeve 11 and a second sleeve 12. The second sleeve 12 is a part of the first part 1a adjacent to the protective cover 3. The first sleeve 11 is arranged on the box body 2 and extends to the interior of the reinforcing beam 4, and the second sleeve 12 is detachably connected to the first sleeve 11 and is coaxially arranged with the first sleeve 11. One end portion of the second sleeve 12 away from the first sleeve 11 is the fourth end portion 1212.

Figure 1:
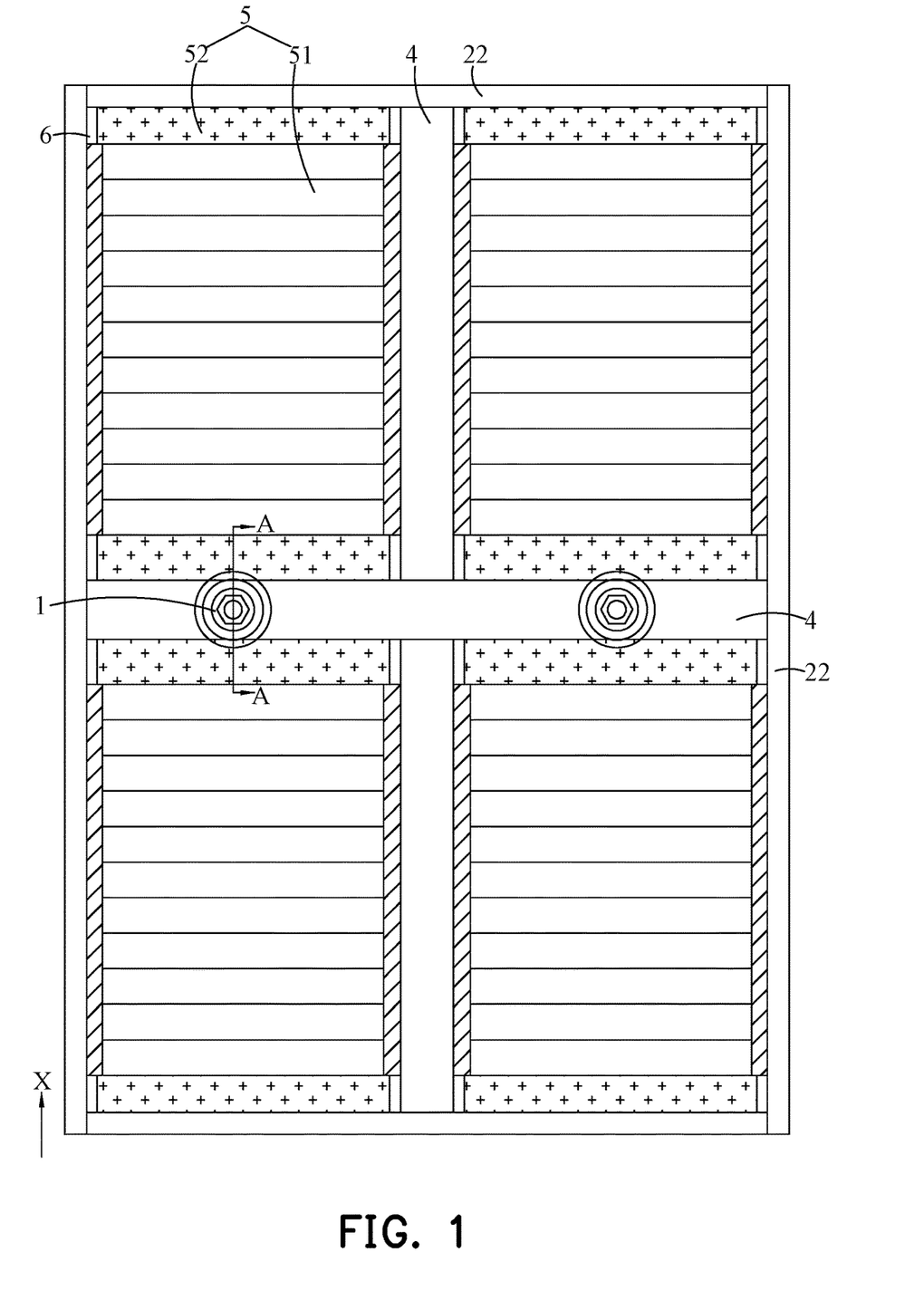
FIG. 1 is a schematic structural view of an exemplary embodiment of a battery device in the disclosure.
Figure 2:
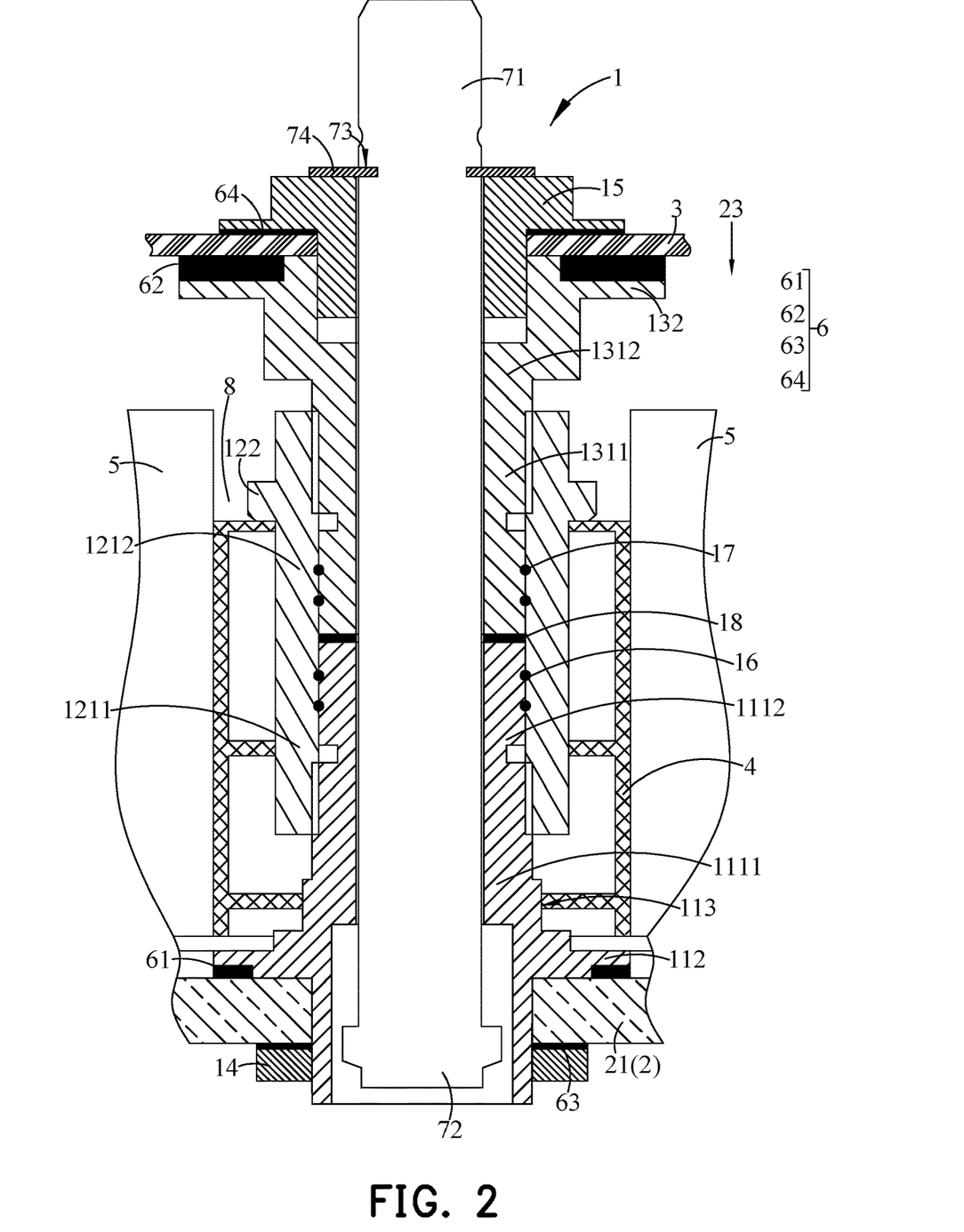
FIG. 2 is a schematic view of the structure taken along line A-A in FIG. 3.
Figure 3:
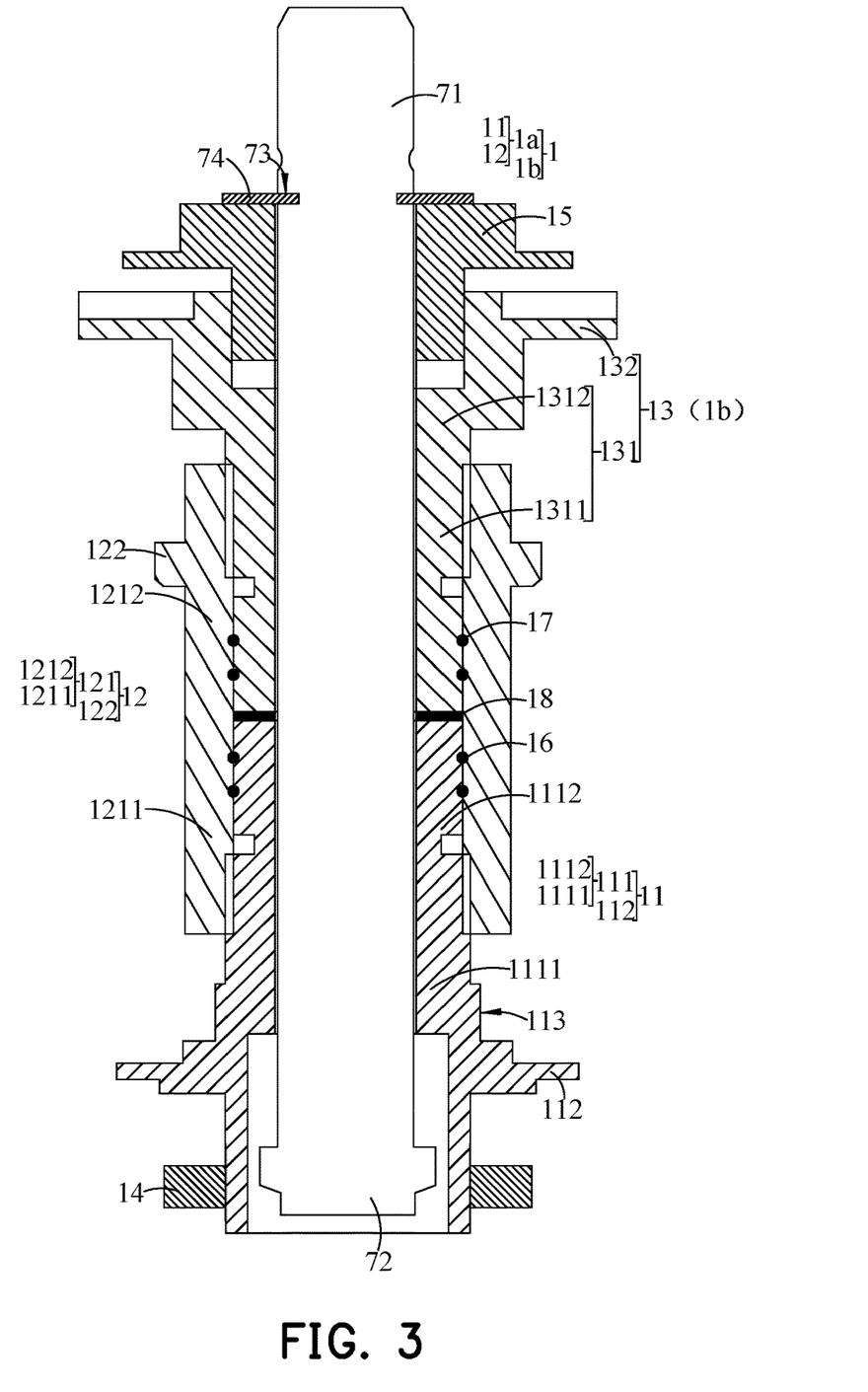
FIG. 3 is a schematic view of the structure of a lifting lug assembly in FIG. 2.

Specifically, as shown in FIG. 2 and FIG. 3, in the present exemplary embodiment, the first sleeve 11 may include a first cylindrical body 111 and a first protrusion 112. The first cylindrical body 111 has a first end portion 1111 and a second end portion 1112 communicating with each other, that is, the first cylindrical body 111 has the first end portion 1111 and the second end portion 1112 arranged opposite to each other, the first cylindrical body 111 is provided with a through hole, and the through hole penetrates through the first end portion 1111 and the second end portion 1112. The first protrusion 112 is provided on the first end portion 1111 of the first cylindrical body 111. The first protrusion 112 is provided in an annular structure, and the first protrusion 112 protrudes to one side away from the central axis of the first sleeve 11. The first end portion 1111 is further provided with an external thread, and the second end portion 1112 is also provided with an external thread. Certainly, in other exemplary embodiments of the present disclosure, the first protrusion 112 may include a plurality of protruding structures that protrude to one side away from the central axis of the first sleeve 11, and the protruding structures may be configured as fan-ring shapes, or a surface of the protruding structure connected to the first cylindrical body 111 is an arc surface, and the opposite surface of the protruding structure is set as a planar surface.

An anti-rotation plane 113 is provided on the outer cylindrical wall of the first cylindrical body 111, such that the outer cylindrical wall of the first cylindrical body 111 is not all provided in a cylindrical shape. The number of the anti-rotation plane 113 may be one, two or more. The anti-rotation plane 113 is configured to cooperate with the reinforcing beam 4, that is, a plane is also provided on the reinforcing beam 4. After the first sleeve 11 is assembled, the plane on the reinforcing beam 4 fits with the anti-rotation plane 113, such that the first sleeve 11 does not rotate. In the process of screwing the second sleeve 12 to the first sleeve 11, if the first sleeve 11 rotates, the second sleeve 12 will not be able to be screwed with the first sleeve 11, and the first sleeve 11 does not rotate, such that the second sleeve 12 and the first sleeve 11 can be easily screwed together to improve the assembly efficiency. Moreover, if the first sleeve 11 rotates during use, the first sleeve 11 and the second sleeve 12 are easily loosened, and therefore, the configuration of the anti-rotation plane 113 may also ensure the connection effect and durability between the second sleeve 12 and the first sleeve 11.

The anti-rotation plane 113 is formed in the manner of cutting off a portion of the cylindrical boss near the first protrusion 112.

The through hole in the first sleeve 11 is not a straight through hole, but a stepped through hole. Specifically, the diameter of the first through hole adjacent to the first end portion 1111 is larger than the diameter of the second through hole adjacent to the second end portion 1112, and the first through hole is connected to the second through hole to form the stepped through hole.

In the present exemplary embodiment, the second sleeve 12 may include a second cylindrical body 121 and a second protrusion 122. The second cylindrical body 121 has a third end portion 1211 and a fourth end portion 1212 communicating with each other. That is, the second cylindrical body 121 has the third end portion 1211 and the fourth end portion 1212 arranged opposite to each other. The second cylindrical body 121 is provided with a through hole, and the through hole penetrates through the third end portion 1211 and the fourth end portion 1212. The second protrusion 122 is provided between the third end portion 1211 and the fourth end portion 1212 of the second cylindrical body 121, that is, the second protrusion 122 is provided approximately at the middle of the second cylindrical body 121. The second protrusion 122 is set as a ring structure, and the second protrusion 122 protrudes to one side away from the central axis of the second sleeve 12, that is, the second protrusion 122 protrudes radially from the second cylindrical body 121. The width of the second protrusion 122 in the first direction X is the widest, the second protrusion 122 and the battery group 5 are provided with the gap 8 therebetween or abut against each other in the first direction X, as such, the second sleeve 12 and the battery group 5 are provided with a gap therebetween in the first direction X, such that the first part 1a does not interfere with the entry of the battery group 5 into the box. The third end portion 1211 is further provided with an inner thread, which cooperates with the external thread of the second end portion 1112, such that the second sleeve 12 is detachably connected to the first sleeve 11. The fourth end portion 1212 is also provided with an inner thread.

Certainly, in other exemplary embodiments of the present disclosure, the second protrusion 122 may include a plurality of protruding structures that protrude to one side away from the central axis of the second cylindrical body 121, and the protruding structures may be configured as fan-ring shapes, or a surface of the protruding structure connected to the second cylindrical body 121 is an arc surface, and the opposite surface is set as a planar surface. The second protrusion 122 may further be provided at the fourth end portion 1212.

The second part 1b may include a third sleeve 13. In the exemplary embodiment, the third sleeve 13 may include a third cylindrical body 131 and a third protrusion 132. The third cylindrical body 131 has a fifth end portion 1311 and a sixth end portion 1312 communicating with each other, that is, the third cylindrical body 131 has the fifth end portion 1311 and the sixth end portion 1312 disposed opposite to each other. A through hole is provided on the third cylindrical body 131, and the through hole penetrates through the fifth end portion 1311 and the sixth end portion 1312. The third protrusion 132 is provided on the sixth end portion 1312 of the third cylindrical body 131, the third protrusion 132 is provided in a ring structure, and the third protrusion 132 protrudes to one side away from the central axis of the third sleeve 13. The orthographic projection of the third protrusion 132 on the bottom surface of the box body 2 overlaps the orthographic projection of the battery group 5 on the bottom surface of the box body 2. In this manner, after the third sleeve 13 is assembled, the third protrusion 132 will interfere with the entry of the battery group 5 into the box. The fifth end portion 1311 is further provided with an external thread, which cooperates with the internal thread of the fourth end portion 1212, such that the third cylindrical body 131 is detachably connected to the second sleeve 12. The sixth end portion 1312 is also provided with an external thread.

Certainly, in other exemplary embodiments of the present disclosure, the third protrusion 132 may include a plurality of protruding structures protruding to one side away from the central axis of the third cylindrical body 131, and the protruding structures may be arranged in a fan-ring shapes, or a surface of the protruding structures connected to the third cylindrical body 131 is an arc surface, and the opposite surface is set as a planar surface.

The first sleeve 11, the second sleeve 12 and the third sleeve 13 are arranged on the same central axis.

The first sleeve 11 and the second sleeve 12 as well as the third sleeve 13 and the second sleeve 12 are all connected by threads. Compared with the conventional common welding method, the damage to the lifting lug assembly 1 is smaller, and the components may be disassembled and assembled many times. Moreover, the product loss rate during the assembly process is low, and the assembly is convenient.

The lifting lug assembly 1 may further include a first fixing nut 14, and the first fixing nut 14 is threadedly engaged with the first sleeve 11. Specifically, the first fixing nut 14 is threadedly engaged with the external thread of the first end portion 1111 of the first sleeve 11. The first fixing nut 14 and the first protrusion 112 are correspondingly pressed on opposite sides of the box body 2. Specifically, the first protrusions 112 are pressed on the inner side of the bottom shield 21 of the box body 2, and the first fixing nut 14 is pressed on the outer side of the bottom shield 21 of the box body 2, that is, the first sleeve 11 is fixedly connected to the bottom shield 21 of the box body 2 through the first fixing nut 14 and the first protrusion 112.

Each lifting lug assembly 1 may further include a second fixing nut 15, and the second fixing nut 15 is threadedly engaged with the third sleeve 13. Specifically, the second fixing nut is threadedly engaged with the external thread of the sixth end portion 1312 of the third sleeve 13. The second fixing nut 15 and the third protrusion 132 are correspondingly pressed on opposite sides of the protective cover 3. Specifically, the third protrusion 132 is pressed on the inner side of the protective cover 3, and the second fixing nut 15 is pressed on the outer side of the protective cover 3. That is, the third sleeve 13 is fixedly connected to the protective cover 3 through the second fixing nut 15 and the third protrusion 132.

Certainly, in other exemplary embodiments of the present disclosure, the first fixing nut 14 and the second fixing nut 15 may not be provided, and the first protrusion 112 may be directly pressed on the outer side of the bottom shield 21 of the box body 2, and the third protrusion 132 is directly pressed on the outer side of the protective cover 3.

In the present exemplary embodiment, each lifting lug assembly 1 may further include a first sealing member 16, and the first sealing member 16 is provided between the first sleeve 11 and the second sleeve 12.

Specifically, a part of the second end portion 1112 of the first sleeve 11 is configured as a smooth outer cylindrical surface, and this outer cylindrical surface is located at one end of the external thread away from the first end portion 1111, that is, the outer cylindrical surface is located at the outermost end of the second end portion 1112. The outer cylindrical surface is provided with two first grooves. The first grooves are annular and are arranged around the central axis of the first sleeve 11. The middle of the second sleeve 12 is set as a smooth inner cylindrical surface, and this inner cylindrical surface is provided with four second grooves. The second grooves are arranged in an annular shape, and are arranged around the central axis of the second sleeve 12. By this arrangement, during the process of screwing the first sleeve 11 and the second sleeve 12 together, it is possible to avoid the friction damages caused by the thread to the first sealing member 16. The first grooves are disposed opposite to a part of the second grooves to form a sealing groove for accommodating the first sealing member 16. The first sealing member 16 may be a sealing ring, there are two first sealing members 16, and the first sealing members 16 are located in the sealing grooves formed by the first grooves and the second grooves.

Certainly, the above data is only an example, and does not constitute a limitation to the present disclosure. The numbers of the first groove, the second groove and the first sealing member 16 may be set as required, and the more they are provided, the better the sealing effect may be achieved. In addition, in other exemplary embodiments of the present disclosure, the first groove may be provided only in the second end portion 1112 of the first sleeve 11, or the second groove may be provided only in the middle of the second sleeve 12. The first groove may further be provided on one side of the second end portion 1112 adjacent to the first end portion 1111, that is, the position of the first groove and the position of the external thread are switched. Correspondingly, a part of the second groove may be provided on the third end portion 1211 of the second sleeve 12. The first sealing member 16 may also be provided as an annular gasket.

In the present exemplary embodiment, each lifting lug assembly 1 may further include a second sealing member 17, and the second sealing member 17 is provided between the second sleeve 12 and the third sleeve 13.

Specifically, a part of the fifth end portion 1311 of the third sleeve 13 is configured as a smooth outer cylindrical surface, and the outer cylindrical surface is located at one end of the external thread away from the sixth end portion 1312, that is, the outer cylindrical surface is located at the outermost end of the fifth end portion 1311. There are two third grooves provided on the outer cylindrical surface, and the third grooves are arranged in an annular shape and are arranged around the central axis of the first sleeve 11. By this arrangement, during the process of screwing the third sleeve 13 and the second sleeve 12 together, it is possible to avoid the friction damages caused by the thread to the second sealing member 17. The third grooves are disposed opposite to another part of the second grooves to form a sealing groove for accommodating the second sealing member 17. The second sealing member 17 may be a sealing ring, the number of the second sealing member 17 is two, and the second sealing members 17 are located in the sealing groove formed by the third grooves and the second grooves.

Certainly, the above data is only an example, and does not constitute a limitation to the present disclosure. The numbers of the third groove, the second groove and the second sealing member 17 may be set as required, and the more the components are provided, the better the sealing effect may be achieved. In addition, in other exemplary embodiments of the present disclosure, the third groove may be provided only in the fifth end portion 1311 of the third sleeve 13, or the second groove may be provided only in the middle of the second sleeve 12. The third groove may further be provided on one side of the fifth end portion 1311 adjacent to the sixth end portion 1312, that is, the position of the third groove and the position of the external thread are switched. Correspondingly, a part of the second groove may be provided on the fourth end portion 1212 of the second sleeve 12. The second sealing member 17 may also be provided as an annular gasket.

In the present exemplary embodiment, each lifting lug assembly 1 may further include a third sealing member 18, and the third sealing member 18 is provided between the first sleeve 11 and the third sleeve 13.

Specifically, the third sealing member 18 may be a sealing gasket, and the third sealing member 18 is disposed between the end surface of the second end portion 1112 of the first sleeve 11 and the end surface of the fifth end portion 1311 of the third sleeve 13. The width of the sealing gasket, the width of the end surface of the fifth end portion 1311 and the width of the end surface of the second end portion 1112 may be the same, so as to ensure that the whole third sealing member 18 can achieve a sealing effect. In other exemplary embodiments of the present disclosure, the third sealing member 18 may be a sealing ring, a sealing groove may be provided on the end surface of the second end portion 1112, and a sealing groove may be provided on the end surface of the fifth end portion 1311, and the two sealing grooves form a sealing groove for accommodating the third sealing member 18. Certainly, the groove may be provided only on the end surface of the second end portion 1112, or only on the end surface of the fifth end portion 1311.

The third sealing member 18 is the first seal between the inside of the battery device and the outer environment. The second sealing member 17 and the first sealing member 16 are the second seal between the inside of the battery device and the outer environment. The thread engagement of the first sleeve 11 and the second sleeve 12 and thread engagement of the third sleeve 13 and the second sleeve 12 are the third seal between the inside of the battery device and the outer environment. The water vapor entering from the through hole of the first sleeve 11 will be blocked by the above three seals and cannot enter the interior of the battery device. Similarly, the water vapor entering from the through hole of the third sleeve 13 will also be blocked by the above three seals and cannot enter the interior of the battery device.

Figure 4:
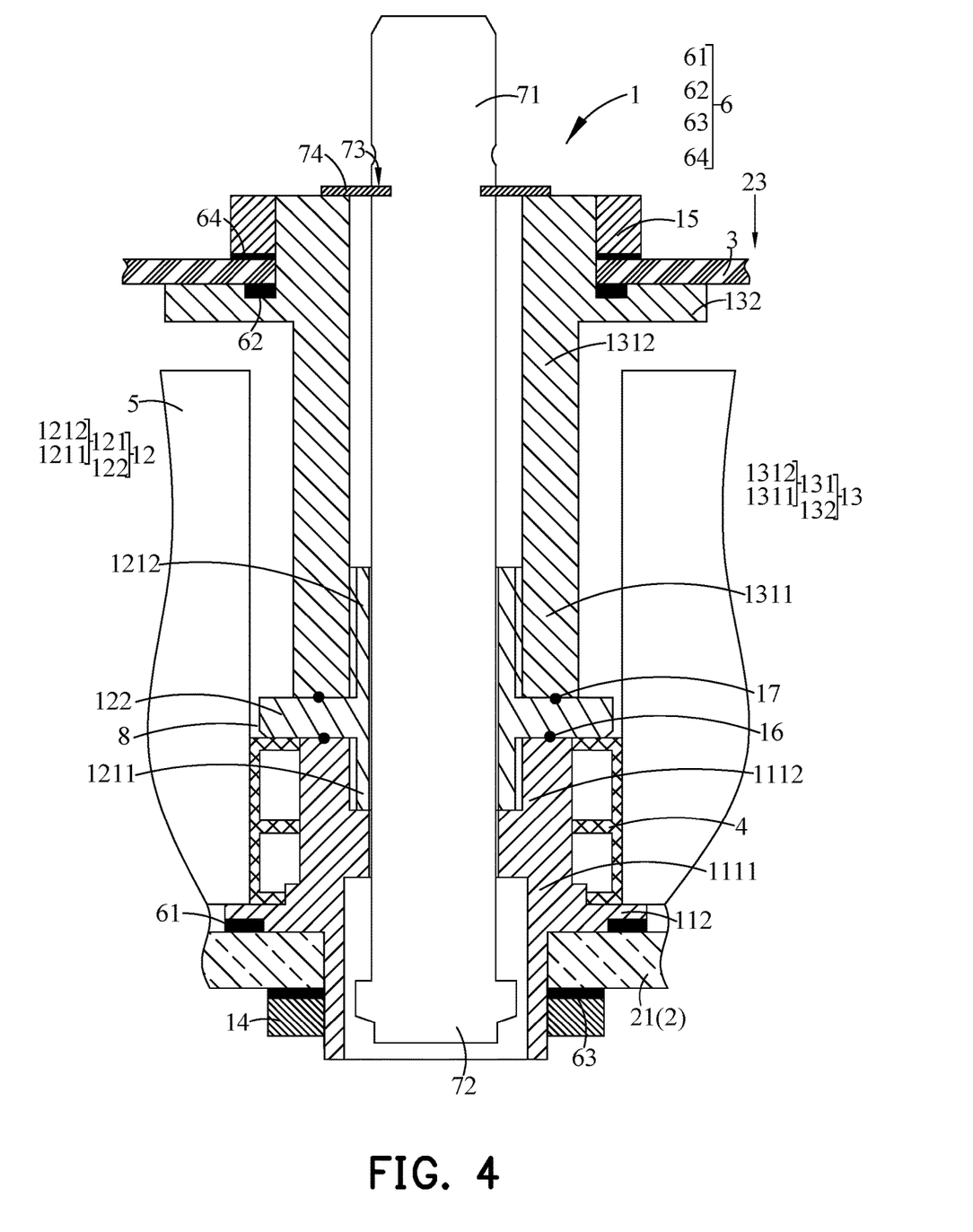
FIG. 4 is a schematic structural view of another exemplary embodiment of a battery device of the disclosure.
Figure 5:
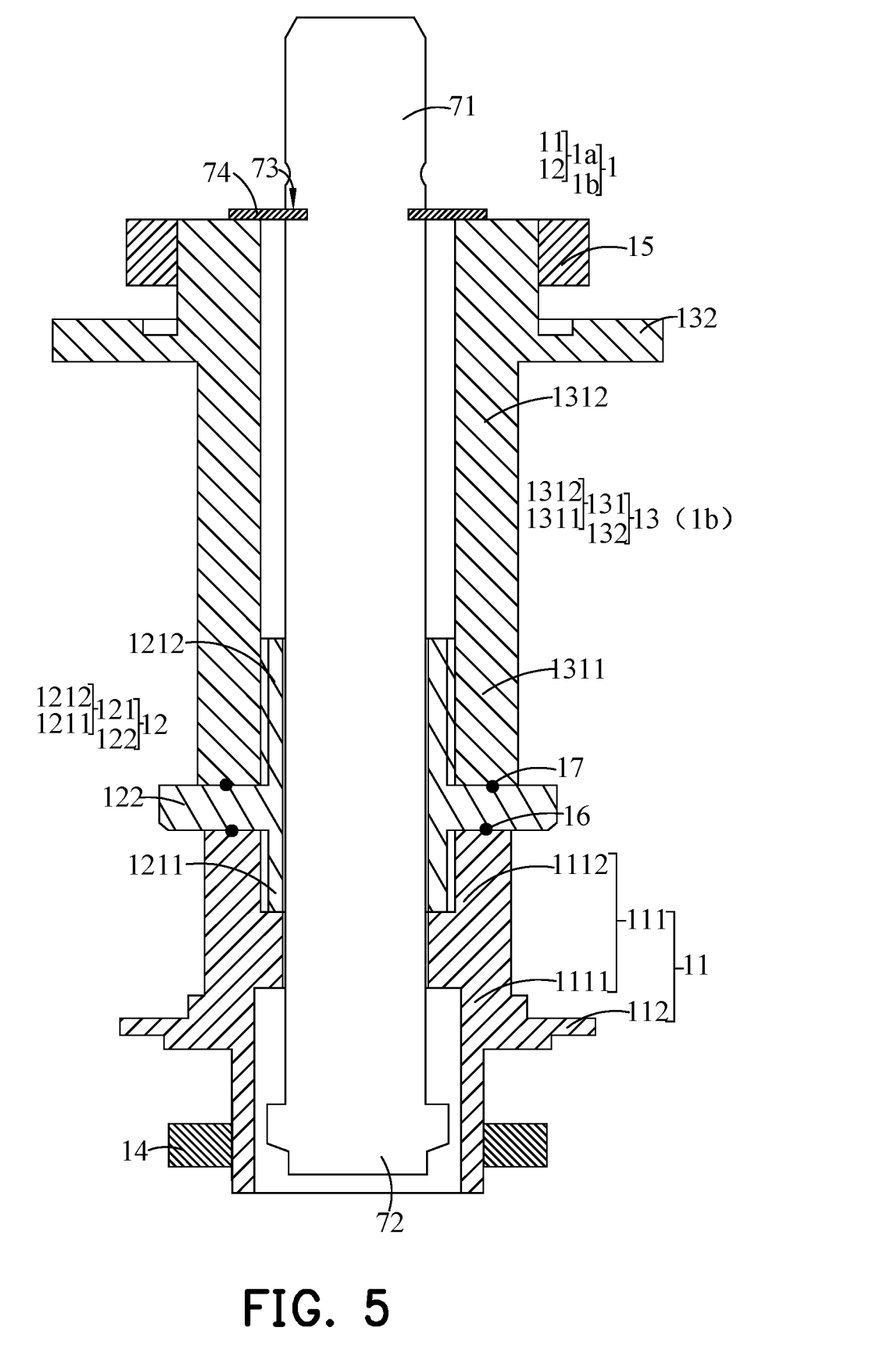
FIG. 5 is a schematic view of the structure of a lifting lug assembly in FIG. 4.

Referring to FIG. 4 and FIG. 5, in another exemplary embodiment of the present disclosure, the second end portion 1112 of the first sleeve 11 is provided with an inner thread, and the third end portion 1211 of the second sleeve 12 is provided with an external thread, the inner thread of the second end portion 1112 is matched with the outer thread of the third end portion 1211, and the detachable connection between the first sleeve 11 and the second sleeve 12 may also be realized.

The fourth end portion 1212 of the second sleeve 12 is provided with an external thread, the fifth end portion 1311 of the third sleeve 13 is provided with an internal thread, and the external thread of the fourth end portion 1212 is matched with the internal thread of the fifth end portion 1311. The detachable connection between the third sleeve 13 and the second sleeve 12 may also be realized.

The end surface of the second end portion 1112 of the first sleeve 11 abuts against one surface of the second protrusion 122 adjacent to the first sleeve 11, and a fourth groove is provided on the end surface of the second end portion 1112 of the first sleeve 11. A sealing ring is arranged in the fourth groove, and the sealing ring forms the first sealing member 16. Certainly, the fourth groove may not be provided, and a sealing gasket may be directly provided on the end surface of the second end portion 1112 and one surface of the second protrusion 122 adjacent to the first sleeve 11, and the sealing gasket forms the first sealing member 16.

The end surface of the fifth end portion 1311 of the third sleeve 13 abuts against one surface of the second protrusion 122 adjacent to the third sleeve 13, and a fifth groove is provided on the end surface of the fifth end portion 1311 of the third sleeve 13. A sealing ring is arranged in the fifth groove, and the sealing ring forms the second sealing member 17. Certainly, the fifth groove may not be provided, and a sealing gasket may be directly provided on the end surface of the fifth end portion 1311 and one surface of the second protrusion 122 adjacent to the third sleeve 13, and the sealing gasket forms the second sealing member 17.

In addition, in some exemplary embodiments of the present disclosure, the connection between the first sleeve 11 and the second sleeve 12 may adopt the structure in the exemplary embodiment of FIG. 3, and the connection between the third sleeve 13 and the second sleeve 12 may adopt the structure in the exemplary embodiment of FIG. 5. Or conversely, the connection between the first sleeve 11 and the second sleeve 12 may adopt the structure in the exemplary embodiment of FIG. 5, and the connection between the third sleeve 13 and the second sleeve 12 may adopt the structure in the exemplary embodiment of FIG. 3.

Each lifting lug assembly 1 may further include a connecting rod 71. The connecting rod 71 penetrates through the through hole on the first sleeve 11, the through hole on the second sleeve 12 and the through hole on the third sleeve 13, and the connecting rod 71 protrudes from the third sleeve 13. The connecting rod 71 and the first sleeve 11, the second sleeve 12 and the third sleeve 13 are coaxially arranged. One end of the connecting rod 71 protruding from the third sleeve 13 is provided with an external thread, and the external thread may be connected and fitted with the internal thread on a vehicle body.

The connecting rod 71 is fitted into the second through hole of the first sleeve 11, and the diameter of the connecting rod 71 is slightly smaller than the diameter of the second through hole, such that the second through hole can guide the connecting rod 71. One end of the connecting rod 71 adjacent to the first sleeve 11 is provided with a nut 72, and the nut 72 is fitted into the first through hole of the first sleeve 11. The diameter of the nut 72 is larger than the diameter of the connecting rod 71, and the diameter of the nut 72 is slightly smaller than the diameter of the first through hole. The nut 72 abuts against the step surface at the connection between the first through hole and the second through hole, such that the lifting lug assembly 1 and the battery pack or the battery module are connected to the vehicle body through the fitting between the nut 72 and the thread.

One end of the connecting rod 71 adjacent to the first sleeve 11 is provided with a position-limiting groove 73 surrounding a central axis of the connecting rod 71. A position-limiting engaging plate 74 is arranged in the position-limiting groove 73. The position-limiting engaging plate 74 protrudes from the position-limiting groove 73, and the diameter of the outer circumference of the position-limiting engaging plate 74 is larger than the diameter of the through hole on the third sleeve 13. The distance between the position-limiting engaging plate 74 and the nut 72 is greater than the sum of the depth of the second through hole and the depth of the through hole of the third sleeve 13. The position-limiting engaging plate 74 and the nut 72 movably connect the connecting rod 71 to the lifting lug assembly 1, and this prevents the connecting rod 71 from separating from the lifting lug assembly 1.

Figure 6:
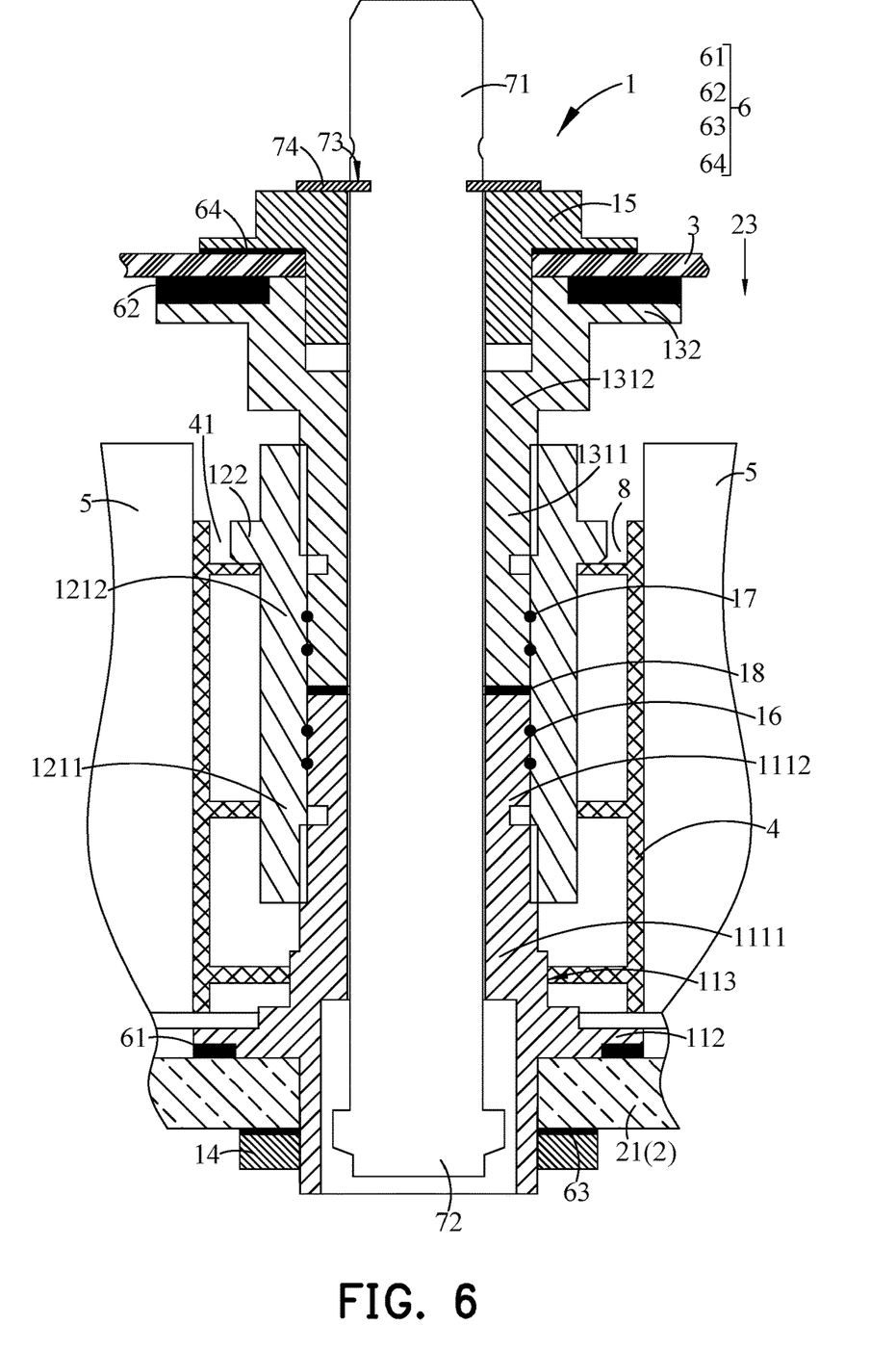
FIG. 6 is a schematic structural view of another exemplary embodiment of a battery device of the disclosure.

In other exemplary embodiments of the present disclosure, as shown in FIG. 6, a groove 41 is provided on one surface of the reinforcing beam 4 away from the first sleeve 11, and the shape of the groove 41 may be adapted to the shape of the second protrusion 122, that is, the second protrusion 122 is set as a cylindrical shape, and the groove 41 is correspondingly set as a cylindrical groove, or the second protrusion 122 is set as a prismatic shape, and the groove 41 is correspondingly set as a prismatic groove. The groove 41 may also be set larger to be any shape large enough to accommodate the second protrusion 122 may be adopted. The second protrusion 122 is located in the groove 41, that is, the width of the reinforcing beam 4 is equal to or greater than the width of the second protrusion 122, such that the second protrusion 122 does not protrude from the reinforcing beam 4, so as to prevent the second protrusion 122 from interfering with the entry of the battery group 5 into the box. In still other exemplary embodiments of the present disclosure, the height of the second protrusion 122 may be greater than the depth of the groove 41, and a part of the second protrusion 122 is provided in the groove 41, which can also prevent the second protrusion 122 from interfering with the entry of the battery group 5 into the box.

In the present exemplary embodiment, the first sleeve 11 of the lifting lug assembly 1 is fixedly connected to the bottom shield 21. Specifically, the first protrusion 112 of the first sleeve 11 and the first fixing nut 14 sandwich the bottom shield 21 for fixation. The second sleeve 12 is fixedly connected to the reinforcing beam 4. Specifically, the second protrusion 122 of the second sleeve 12 and the first protrusion 112 of the first sleeve 11 sandwich the reinforcing beam 4 for fixation. The third sleeve 13 is fixedly connected to the protective cover 3. Specifically, the third protrusion 132 of the third sleeve 13 and the second fixing nut 15 sandwich the protective cover 3 for fixation.

In the present exemplary embodiment, referring to FIG. 2, FIG. 4 and FIG. 6, the battery device may further include a sealing portion 6, and the sealing portion 6 may be provided on the lifting lug assembly 1 and the box body 2, as well as between the lifting lug assembly 1 and the protective cover 3. The sealing portion 6 may include a fourth sealing member 61, a fifth sealing member 62, a sixth sealing member 63 and a seventh sealing member 64.

The fourth sealing member 61 is arranged between the first sleeve 11 and the bottom shield 21. The fourth sealing member 61 may be a sealing gasket, and is specifically arranged between the first protrusion 112 of the first sleeve 11 and the bottom shield 21. In this way, water vapor, dust, and the like from the outer environment are prevented from entering the interior of the battery device through the gap between the first protrusion 112 and the bottom shield 21. Certainly, in other exemplary embodiments of the present disclosure, a sealing groove may be provided on one or both of the first protrusion 112 and the bottom shield 21, and the fourth sealing member 61 may be provided in the sealing groove, in this case, the fourth sealing member 61 may be a sealing ring.

In this exemplary embodiment, the fifth sealing member 62 is provided between the third sleeve 13 and the protective cover 3. The fifth sealing member 62 may be a sealing gasket, and is specifically provided between the third protrusion 132 of the third sleeve 13 and the protective cover 3, so as to prevent external water vapor, dust, and the like from entering the interior of the battery device through the gap between the third protrusion 132 and the protective cover 3. Certainly, in other exemplary embodiments of the present disclosure, a sealing groove may be provided on one or both of the third protrusion 132 and the protective cover 3, and the fifth sealing member 62 may be provided in the sealing groove, in this case, the fifth sealing member 62 may be a sealing ring.

In the present exemplary embodiment, the sixth sealing member 63 is provided between the first fixing nut 14 and the bottom shield 21. The sixth sealing member 63 may be a sealing gasket, so as to prevent external water vapor, dust, and the like from entering the inside of the battery device through the gap between the first fixing nut 14 and the bottom shield 21. Certainly, in other exemplary embodiments of the present disclosure, a sealing groove may be provided on one or both of the first fixing nut 14 and the bottom shield 21. The sixth sealing member 63 may be provided in the sealing groove, and in this case, the sixth sealing member 63 may be a sealing ring.

In the present exemplary embodiment, the seventh sealing member 64 is provided between the second fixing nut 15 and the protective cover 3. The seventh sealing member 64 may be a sealing gasket, so as to prevent the external water vapor, dust, and the like from entering the inside of the battery device through the gap between the second fixing nut 15 and the protective cover 3. Certainly, in other exemplary embodiments of the present disclosure, a sealing groove may be provided on one or both of the second fixing nut 15 and the protective cover 3. The seventh sealing member 64 may be provided in the sealing groove, and in this case, the seventh sealing member 64 may be a sealing ring.

Figure 7:
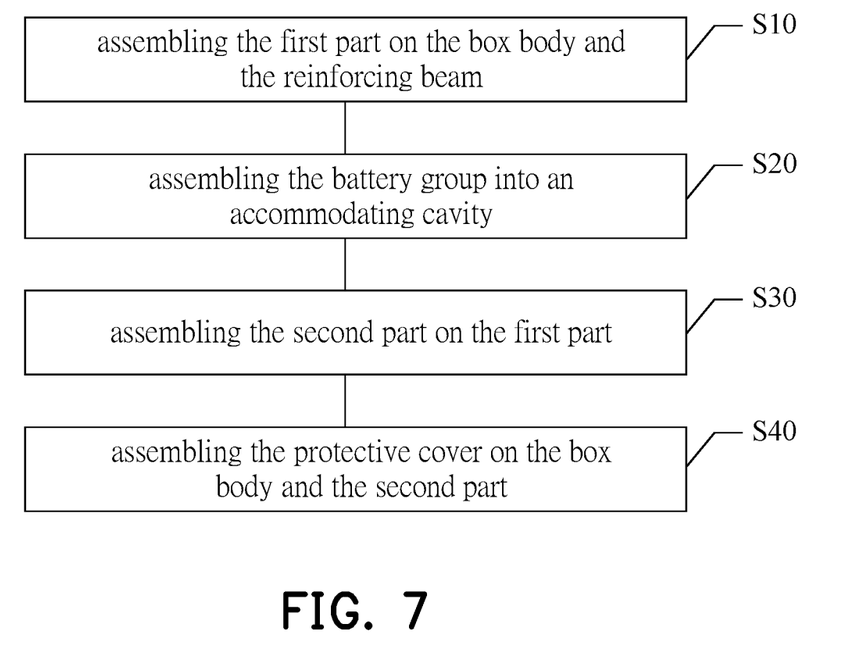
FIG. 7 is a schematic flow chart of an exemplary embodiment of an assembling method of a battery device of the present disclosure.

Based on the same inventive concept, an exemplary embodiment of the present disclosure provides an assembling method of a battery device, and the assembling method is used to assemble the battery device described in any of the above. Referring to FIG. 7, the assembling method may include the following steps.

Step S10, assembling the first part on the box body and the reinforcing beam.

Step S20, assembling the battery group into the accommodating cavity.

Step S30, assembling the second part on the first part.

Step S40, assembling the protective cover on the box body and the second part.

In the assembling method of the battery device of the present disclosure, when the battery groups 5 are loaded into the box body 2, since a part of the first part 1a adjacent to the protective cover 3 and the battery groups 5 are provided with a gap therebetween or abut against each other in the first direction X, the first part 1a will not interfere with the entry of the battery groups 5 into the box. The second part 1b has not been arranged yet, therefore, the second part 1b will not interfere with the entry of the battery group 5 into the box, such that the battery group may be inserted into the box body 2 from the insertion port 23.

The assembling method of the battery device will be described in detail below.

First, the first sleeve 11 is fixedly arranged on the bottom shield 21 of the box body 2 through the first fixing nut 14, and then the reinforcing beam 4 is arranged in the box body 2 to form a plurality of accommodating cavities. Thereafter, the second sleeve 12 is inserted into the reinforcing beam 4 and is connected to the first sleeve 11.

Next, the two ends of each of the battery groups 5 are clamped by a mounting jig, and the battery groups 5 are loaded into the accommodating cavity.

Afterwards, the third sleeve 13 is assembled on the second sleeve 12 by screwing.

Finally, the protective cover 3 is assembled on the box body 2 and the third sleeve 13 through the second fixing nut 15.

In the battery device of the present disclosure, before assembling the battery groups 5 into the box, the third sleeve 13 may not be assembled to avoid interference between the third sleeve 13 and the battery groups 5, which affects the assembly of the battery groups 5 into the box.

Specifically, in the case where the second protrusion 122 is provided between the third end portion 1211 and the fourth end portion 1212 of the second cylindrical body 121, the first sleeve 11 is connected to the third end portion 1211 by screwing, and the first sleeve 11 may be connected inside the third end portion 1211, and may also be connected outside the third end portion 1211. The third sleeve 13 is connected to the fourth end portion 1212 through screwing, and the third sleeve 13 may be connected inside the fourth end portion 1212 or connected outside the fourth end portion 1212.

In the case where the second protrusion 122 is provided on the fourth end portion 1212, the first sleeve 11 is connected to the third end portion 1211 by screwing, and the first sleeve 11 may be connected inside the third end portion 1211 or connected outside the third end portion 1211. The third sleeve 13 is connected to the fourth end portion 1212 by screwing, and the third sleeve 13 can only be connected inside the fourth end portion 1212.

It should be noted that although the steps of the battery device assembling method in the present disclosure are described in a specific order in the drawings, this does not require or imply that the steps must be performed in the specific order, or that all the steps shown in the drawings must be performed to achieve the desired result. Additionally or alternatively, some steps may be omitted, multiple steps may be combined into one step for execution, and/or one step may be split into multiple steps for execution, and the like.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery device, comprising:
    a box body, having an insertion port;
    a protective cover, disposed on the insertion port;
    at least one reinforcing beam, disposed in the box body;
    at least one battery group, comprising at least two batteries, wherein the battery group is arranged in the box body; and
    a plurality of lifting lug assemblies, each including a first part and a second part, wherein the second part is detachably connected to the first part, and the first part is fixedly connected to the box body and the reinforcing beam, a part of the first part adjacent to the protective cover and the battery group are provided with a gap therebetween or abut against each other in a first direction, the first direction is perpendicular to a direction in which the battery group is inserted into the box body, such that the battery group is inserted into the box body from the insertion port, and the second part is fixedly connected to the protective cover,
    wherein the first part comprises:
    a first sleeve, arranged on the box body and extending to an interior of the reinforcing beam; and
    a second sleeve, detachably connected to the first sleeve and coaxially arranged with the first sleeve, wherein the second sleeve is the part of the first part adjacent to the protective cover,
    wherein the second sleeve comprises:

a second cylindrical body, having a third end portion and a fourth end portion communicating with each other, wherein the fourth end portion is detachably connected to the second part, and the third end portion is located inside the reinforcing beam and detachably connected to the first sleeve; and a second protrusion, disposed on the fourth end portion, or disposed between the third end portion and the fourth end portion, wherein the second protrusion radially protrudes from the second cylindrical body, the second protrusion is pressed on a surface of the reinforcing beam adjacent to the protective cover, and the second protrusion and the battery group are provided with the gap therebetween or abut against each other in the first direction.

2. The battery device according to claim 1, wherein the battery group abuts against the reinforcing beam.

3. An assembling method of a battery device for assembling the battery device claimed in claim 2, the assembling method comprising:

assembling the first part on the box body and the reinforcing beam;

assembling the battery group into an accommodating cavity;

assembling the second part on the first part; and assembling the protective cover on the box body and the second part.

4. The battery device according to claim 1, wherein the battery group further comprises:

two end insulating plates, correspondingly arranged at both ends of a stacking direction of the batteries, wherein the part of the first part adjacent to the protective cover and the end insulating plates are provided with the gap therebetween or abut against each other in the first direction.

5. An assembling method of a battery device for assembling the battery device claimed in claim 4, the assembling method comprising:

assembling the first part on the box body and the reinforcing beam;

assembling the battery group into an accommodating cavity;

assembling the second part on the first part; and assembling the protective cover on the box body and the second part.

6. The battery device according to claim 1, wherein a groove is provided on the surface of the reinforcing beam adjacent to the protective cover, and at least a part of the second protrusion is located in the groove.

7. An assembling method of a battery device for assembling the battery device claimed in claim 6, the assembling method comprising:

assembling the first part on the box body and the reinforcing beam;

assembling the battery group into an accommodating cavity;

assembling the second part on the first part; and assembling the protective cover on the box body and the second part.

8. The assembling method of the battery device according to claim 7, wherein the step of assembling the first part on the box body and the reinforcing beam comprises:

assembling the first sleeve on the box body;

fixedly connecting the reinforcing beam to the box body; and inserting the second sleeve into the reinforcing beam and connecting the second sleeve to the first sleeve.

9. The battery device according to claim 1, wherein the second part comprises:

a third sleeve, comprising a third cylindrical body and a third protrusion, wherein the third cylindrical body has a fifth end portion and a sixth end portion communicating with each other, the fifth end portion is detachably connected to the second sleeve, the third protrusion is pressed on the protective cover, an orthographic projection of the third protrusion on a bottom surface of the box body overlaps an orthographic projection of the battery group on the bottom surface of the box body.

10. The battery device according to claim 9, wherein each of the lifting lug assemblies further comprises:

a first fixing nut, threadedly engaged with the first sleeve, wherein the first fixing nut and a first protrusion of the first sleeve are respectively pressed on opposite sides of the box body;

a second fixing nut, threadedly engaged with the third sleeve, wherein the second fixing nut and the third protrusion are respectively pressed on opposite sides of the protective cover.

11. An assembling method of a battery device for assembling the battery device claimed in claim 10, the assembling method comprising:

assembling the first part on the box body and the reinforcing beam;

assembling the battery group into an accommodating cavity;

assembling the second part on the first part; and assembling the protective cover on the box body and the second part.

12. An assembling method of a battery device for assembling the battery device claimed in claim 9, the assembling method comprising:

assembling the first part on the box body and the reinforcing beam;

assembling the battery group into an accommodating cavity;

assembling the second part on the first part; and assembling the protective cover on the box body and the second part.

13. The assembling method of the battery device according to claim 12, wherein the step of assembling the first part on the box body and the reinforcing beam comprises:

assembling the first sleeve on the box body;

fixedly connecting the reinforcing beam to the box body; and inserting the second sleeve into the reinforcing beam and connecting the second sleeve to the first sleeve.

14. An assembling method of a battery device for assembling the battery device claimed in claim 1, the assembling method comprising:

assembling the first part on the box body and the reinforcing beam;

assembling the battery group into an accommodating cavity;

assembling the second part on the first part; and assembling the protective cover on the box body and the second part.

15. The assembling method of the battery device according to claim 14, wherein the step of assembling the first part on the box body and the reinforcing beam comprises:

assembling the first sleeve on the box body;

fixedly connecting the reinforcing beam to the box body; and inserting the second sleeve into the reinforcing beam and connecting the second sleeve to the first sleeve.

* * * * *